(12) United States Patent
Mori et al.

(10) Patent No.: US 7,117,926 B2
(45) Date of Patent: Oct. 10, 2006

(54) HEAT EXCHANGER SUPPORT STRUCTURE OF MOTOR VEHICLE

(75) Inventors: Takeshi Mori, Nakano-ku (JP); Satoshi Haneda, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 19 days.

(21) Appl. No.: 10/891,157

(22) Filed: Jul. 15, 2004

(65) Prior Publication Data

US 2005/0022965 A1    Feb. 3, 2005

(51) Int. Cl.
F28F 9/007    (2006.01)
(52) U.S. Cl. ........................ 165/67; 180/68.4
(58) Field of Classification Search .......... 165/67, 165/149, 69; 180/68.4
See application file for complete search history.

(56) References Cited

U.S. PATENT DOCUMENTS

| | | | | |
|---|---|---|---|---|
| 1,322,683 | A * | 11/1919 | Farmer ...................... | 180/68.4 |
| 2,104,723 | A * | 1/1938 | Best ........................... | 180/68.4 |
| 3,121,467 | A * | 2/1964 | Bryant ....................... | 180/68.4 |
| 3,123,170 | A * | 3/1964 | Bryant ....................... | 180/68.4 |
| 4,763,723 | A * | 8/1988 | Granetzke .................... | 165/67 |
| 5,009,262 | A * | 4/1991 | Halstead et al. ............ | 165/140 |
| 5,123,695 | A * | 6/1992 | Kanemitsu et al. ......... | 180/68.4 |
| 5,219,016 | A * | 6/1993 | Bolton et al. ................. | 165/67 |
| 5,441,100 | A * | 8/1995 | Ueda et al. .................... | 165/67 |
| 5,533,780 | A * | 7/1996 | Larson et al. ............... | 180/68.4 |
| 5,785,140 | A * | 7/1998 | Suzuki et al. ............... | 180/68.4 |
| 5,996,684 | A * | 12/1999 | Clifton et al. ................ | 165/67 |
| 6,168,226 | B1 * | 1/2001 | Wycech ...................... | 180/68.4 |
| 6,672,416 | B1 * | 1/2004 | Guyomard et al. ......... | 180/68.4 |
| 6,681,876 | B1 * | 1/2004 | Haneda et al. ............. | 180/68.4 |
| 6,708,790 | B1 * | 3/2004 | Ozawa et al. .............. | 180/68.4 |
| 6,742,615 | B1 * | 6/2004 | Cristante et al. ........... | 180/68.4 |
| 2003/0062148 | A1 * | 4/2003 | Ohki ........................... | 165/67 |

* cited by examiner

*Primary Examiner*—Leonard R. Leo
(74) *Attorney, Agent, or Firm*—Wenderoth, Lind & Ponack, L.L.P.

(57) ABSTRACT

A heat exchanger support structure comprises a heat exchanger support and a heat exchanger and is mounted to the front end portion of a motor vehicle body. The heat exchanger support has an upper heat exchanger support member with upper holes, a lower heat exchanger support member with lower holes located in parallel to the upper heat exchanger support member, right and left side support members respectively connecting right and left portions of the upper and lower side support members, and a hood lock stay connecting intermediate portions of upper and lower side support members, which are integrally formed by injection molding. The heat exchanger has upper pins and lower pins, which are inserted into the upper and lower holes, respectively, with a rubber member disposed between them. The lower heat exchanger support member is formed in a shape like a capital H in cross section and has ribs to reinforce its mechanical strength.

15 Claims, 7 Drawing Sheets

HEAT EXCHANGER SUPPORT STRUCTURE OF MOTOR VEHICLE

BACKGROUND OF THE INVENTION

1. Field of the Invention

The present invention relates to a heat exchanger support structure of a motor vehicle which supports a heat exchanger, such as a radiator, on a motor vehicle body, for example, at its front structure.

2. Description of the Related Art

A heat exchanger support structure of a motor vehicle of this kind is disclosed in, for example, Japanese patent laying-open publication No. (Tokkai) 2003-81135, which illustrates only a radiator core support.

The radiator core support mainly comprises an upper radiator core support member extending laterally with respect to a motor vehicle body, a lower radiator core support member in parallel with and vertically apart from the upper support member, a hood lock stay connecting the center portions of the upper and lower support members with each other, and right and left side support members respectively connecting the upper and lower sides of the upper and lower support members with each other, which are made of steel or aluminum alloy.

The lower support member has an enclosed rectangular cross section and is provided on its upper surface with two lower supporting portions to be laterally separated from each other. The lower supporting member supports a radiator core as a heat exchanger on the lower supporting portions. The upper support member also supports the radiator core similarly to the lower support member. The radiator core support, supporting therein the radiator core, is mounted to a front structure of a motor vehicle body.

In recent years, a radiator core support that has a configuration similar to the above radiator core support and is mainly made of resin is increasing in use for saving weight and its design freedom. In this case, a lower radiator core support member is formed of resin by injection molding to have a cross-sectional shape like a channel that opens rearward for weight saving and easy removal of the molded support member from the mold. The lower support member comprises an upper portion, a lower portion in parallel with the upper portion, and a front vertical wall portion connecting the upper and lower portions with each other. The upper portion is provided on its upper surface with two lower supporting portions laterally separated from each other. The lower support member supports the radiator core on its upper side portion.

The above known conventional heat exchanger support structure of a motor vehicle, however, encounters a problem in that the channel shaped lower support member fails to maintain satisfactory rigidity of the lower supporting portion against a shearing force caused by the radiator core's weight and/or a load fluctuation during vehicle running for a long time.

In order to avoid the above described problem, there have been various attempts, for example, to add as many ribs as possible to weak rigidity portions of the lower radiator core support member, or to position the lower supporting portion as close as possible to the vertical wall portion. The former attempt, however, increases the weight and cost, and the latter the space for installing the radiator.

It is, therefore, an object of the present invention to provide a heat exchanger support structure of a motor vehicle which overcomes the foregoing drawbacks and can strengthen the rigidity, at a lower supporting portion of a lower heat exchanger support member made of resin, against shearing stress caused by weight of a heat exchanger to reduce deformation thereof.

SUMMARY OF THE INVENTION

According to a first aspect of the present invention there is provided a heat exchanger support structure of a motor vehicle comprising a heat exchanger respectively provided with upper and lower supported portions at top and bottom portions thereof, an upper heat exchanger support member which extends in a lateral direction thereof and supports the upper supported portions of the heat exchanger, a lower heat exchanger support member which extends in the lateral direction and is located in parallel to and vertically apart from the upper heat exchanger support member and has a lower supporting portion to support the lower supported portion of the heat exchanger, a right side support member connecting right side portions of the upper and lower heat exchanger support members with each other and a left side support member laterally apart from the right side support member and connecting left side portions of the upper and lower heat exchanger support members with each other. The lower heat exchanger support member is made of resin and formed in a shape like a capital H in cross section taken along a depth direction thereof, and has an upper portion, a lower portion separated vertically from the upper portion, and a vertical wall portion connecting intermediate portions of the upper and lower portions.

Therefore, the lower heat exchanger support member made of resin can reduce its weight, and its H shaped structure causes the lower supporting portion to have sufficient rigidity against shearing forces for a long time. This results in that the heat exchanger can avoid leakage of coolant or refrigerant due to its deformation under torsion or the like.

Preferably, the lower supported portion of the heat exchanger is a lower pin projecting from the bottom portion thereof, the lower supporting portion of the lower heat exchanger support member being a cylinder formed with a hole to receive the lower pin.

Preferably, the lower pin of the heat exchanger is inserted into the hole of the lower supporting portion of the lower heat exchanger support member with a rubber member disposed between the lower pin and the cylinder so that the heat exchanger is resiliently supported on the lower heat exchanger support member.

Preferably, the cylinder of the lower heat exchanger support member forms the vertical wall portion.

Preferably, the rubber member is designed to function as a dynamic damper to reduce vibration of said heat exchanger.

Preferably, the rubber member is formed to have a first cylindrical portion larger than the hole in diameter and a second cylindrical portion integrally connected with the first cylindrical portion and being inserted into the hole of the cylinder.

Preferably, the lower heat exchanger support member has a plurality of ribs connecting the upper and lower portions with each other at both sides of the vertical wall portion.

Preferably, the ribs are slanted with respect to the upper and lower portions to run in a zigzag line.

Preferably, the heat exchanger comprises a radiator and a condenser which are combined with each other.

Preferably, the heat exchanger comprises a radiator with first upper and lower supported portions and a condenser with second upper and lower supported portions, the upper heat exchanger support member having upper supporting portions to respectively support the first and second upper supported portions of the radiator and the condenser, the lower heat exchanger support member having lower supporting portions to respectively support the first and second lower supported portions of the radiator and the condenser.

Preferably, the first and second lower supported portions of the radiator and the condenser are lower pins, the lower supporting portions being formed with holes to receive the lower pins.

Preferably, the lower pins of the radiator and the condenser are inserted into the holes of the lower supporting portions of the lower heat exchanger support member with a cylindrical rubber member disposed in the hole and inserted by the lower pin so that the radiator and the condenser are resiliently supported on the lower heat exchanger support member.

Preferably, the lower supporting portions are arranged along a depth direction of the lower heat exchanger support member, one of the lower supporting portions being a cylinder formed with the hole to receive the lower pin.

Preferably, the upper and lower heat exchanger support members and the right and left side support members are made of resin and integrally formed.

Preferably, the upper heat exchanger support member includes a detachable finisher cover with the upper supporting portion to support the upper supported portion of the heat exchanger.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

Figure 1:
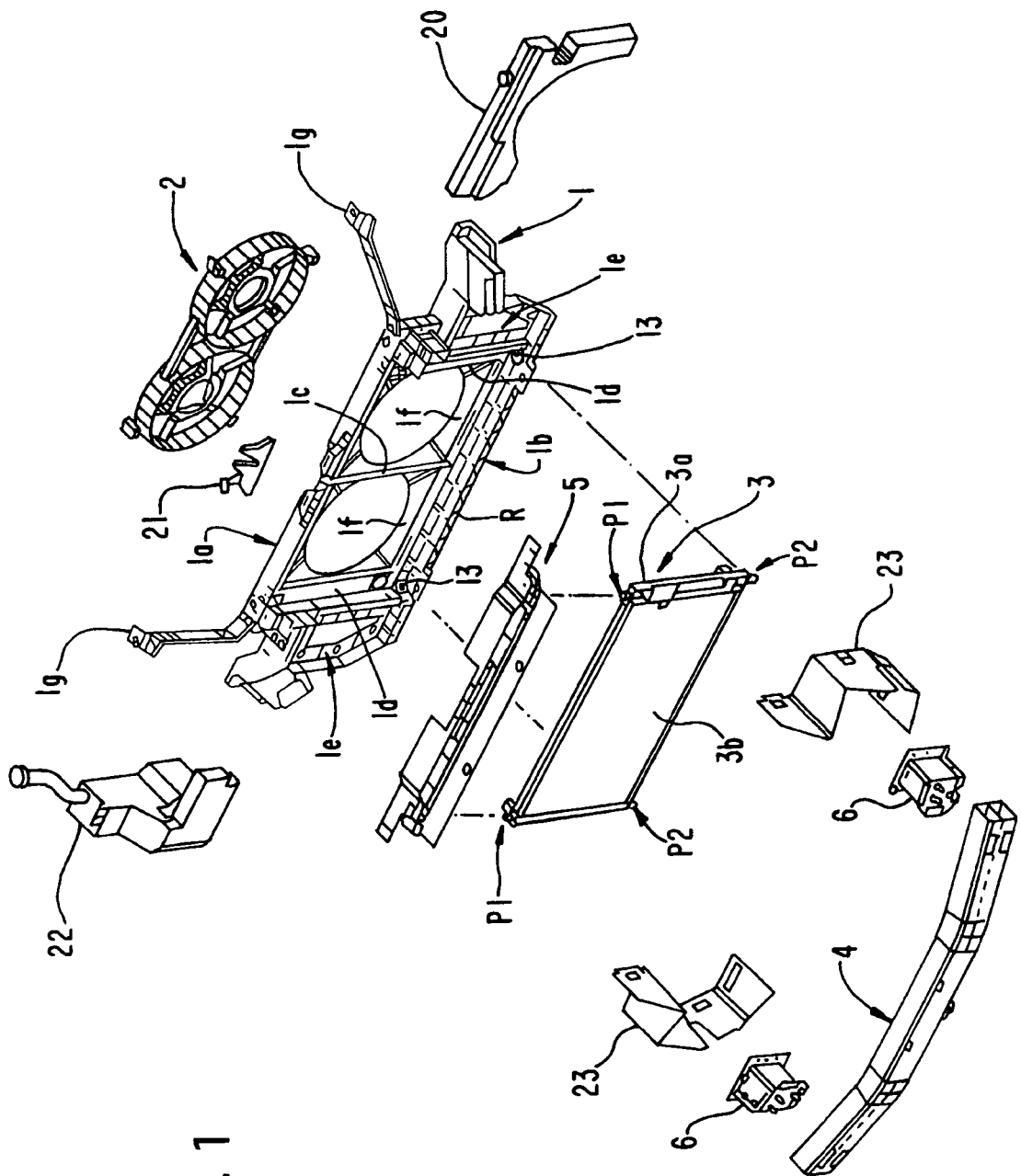
FIG. 1 is an exploded perspective view of a heat exchanger support structure of a motor vehicle of a first preferred embodiment according to the present invention.

In the following, a heat exchanger support structure of the present invention will be described in detail with reference to the accompanying drawings. Throughout the following detailed description, similar reference characters and numbers refer to similar elements in all figures of the drawings.

Figure 2:
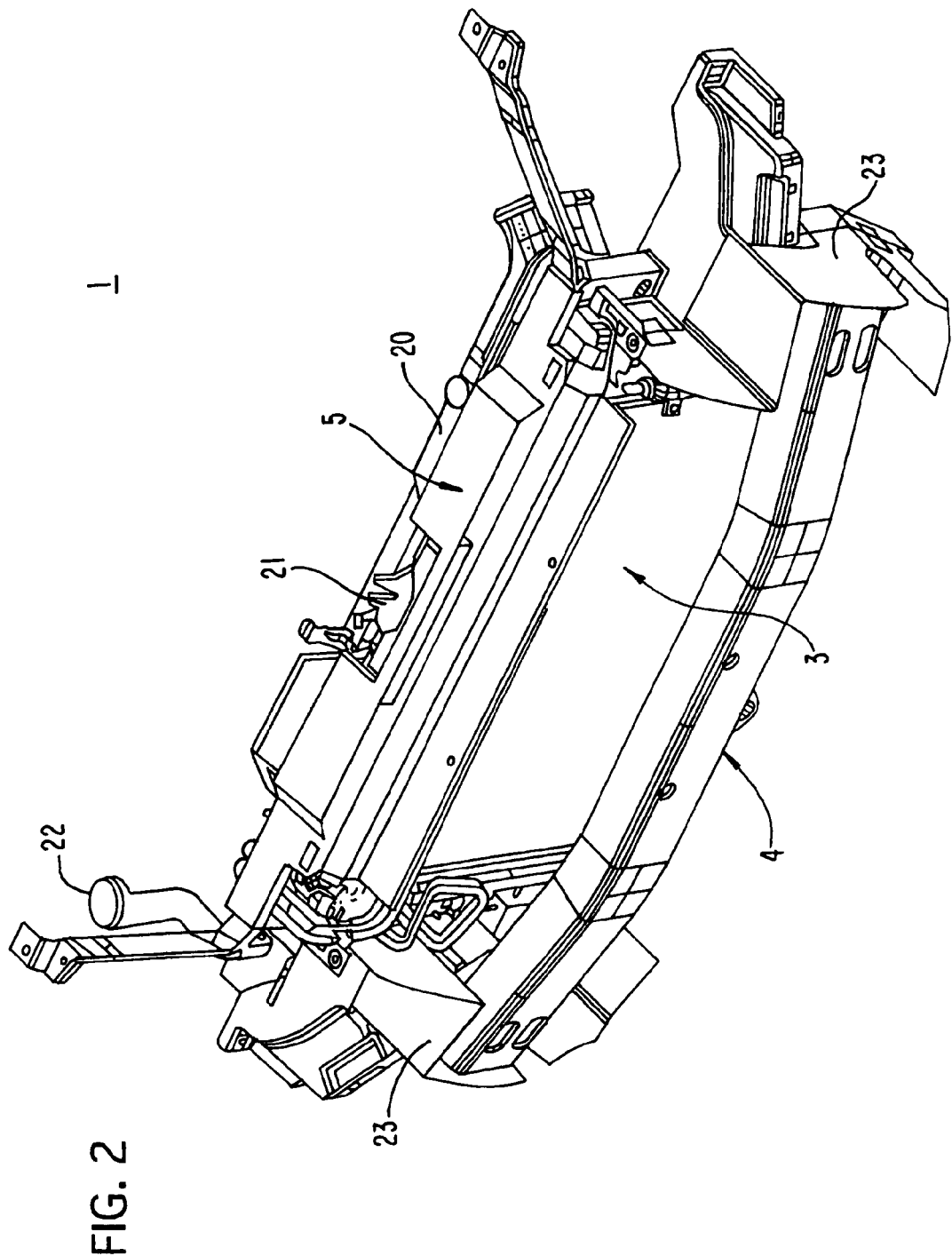
FIG. 2 is an enlarged perspective view showing the heat exchanger support structure, assembled together to form a front end module of a vehicle body, of the embodiment according to the present invention.
Figure 3:
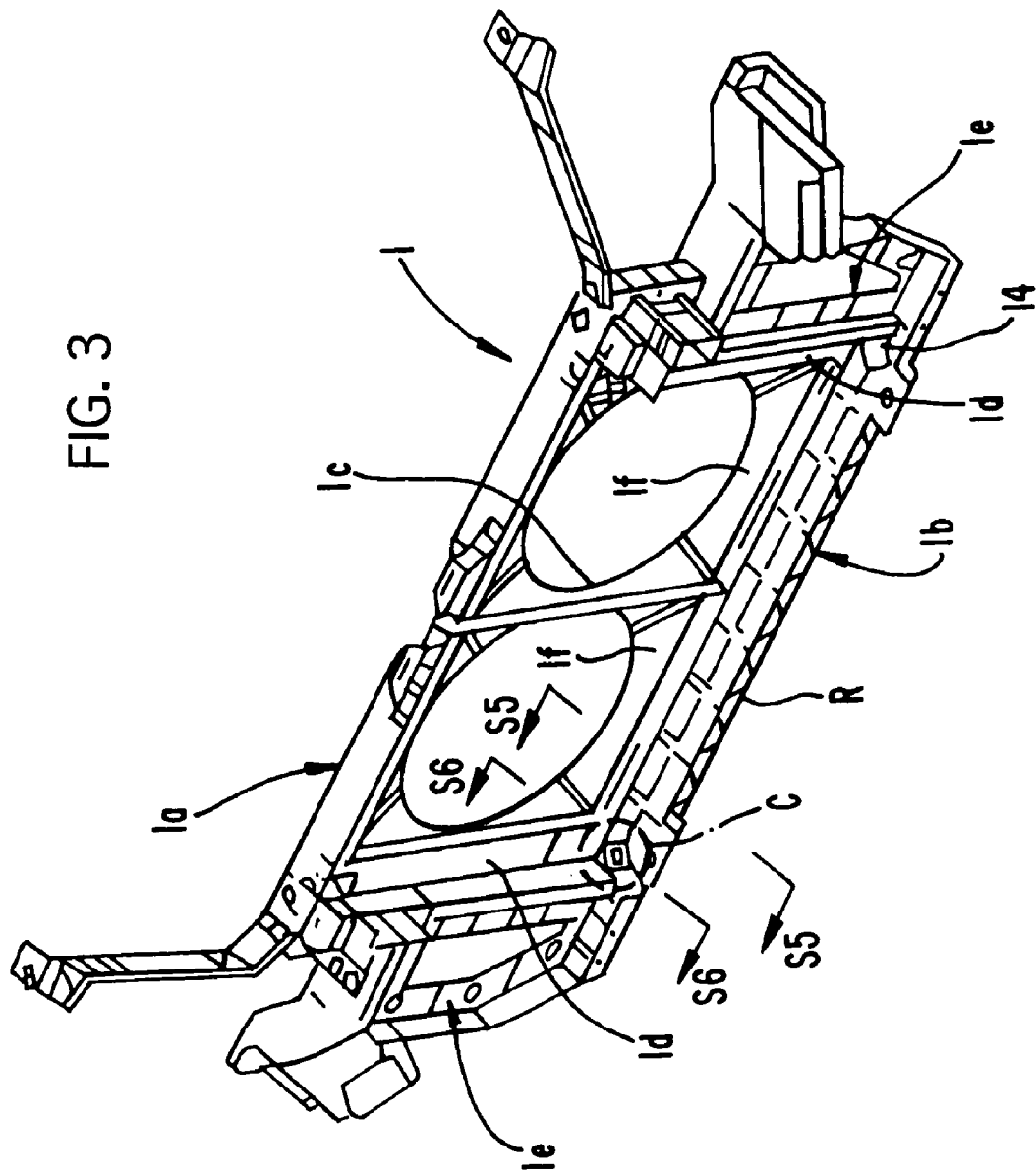
FIG. 3 is an enlarged perspective view showing a heat exchanger support of the heat exchanger support structure shown in FIGS. 1 and 2.

Referring to FIGS. 1 to 3 of the drawings, there is shown a heat exchanger support structure of a first preferred embodiment according to the present invention.

The heat exchanger support structure is mounted to the front end portion of a motor vehicle body and includes a heat exchanger 3 for cooling coolant of an engine and refrigerant of an air conditioner by air flow entering the heat exchanger 3, and a heat exchanger support 1 formed in a rectangular shape and mounted to the vehicle body to resiliently support the heat exchanger 3.

The heat exchanger 3 comprises a radiator 3a for the engine and a condenser 3b for the air conditioner which are combined with each other. The condenser 3b is installed in front of the radiator 3a, while they may be positioned back to front.

The heat exchanger support 1 basically comprises upper and lower heat exchanger support members 1a and 1b both extending along the lateral direction of the vehicle body and located so as to be separated vertically from each other, a hood lock stay 1c extending vertically to have a hood lock 21, made of steel, bolted on its top portion and connect center portions of the upper and lower support members 1a and 1b with each other, a right side support member 1d connecting right side portions of the upper and lower support members 1a and 1b with each other, and a left side support member 1d connecting left side portions of the upper and lower support members 1a and 1b with each other.

The heat exchanger support 1 further comprises right and left side attachment portions 1e respectively secured to right and left side members, not shown, of the vehicle body and two fan shrouds 1f for electric motor fan unit 2 formed at the rear side of the heat exchanger support 1. The right and left side attachment portions 1e project in a lateral direction of the vehicle body from the right and left side support members 1d to have a head lamp mounting portion at each top portion thereof.

The upper support member 1a has a shape like a channel in cross-section along a depth direction thereof to open rearward, and the lower support member 1b a shape like a capital H in cross-section along the depth direction. Namely, the lower support member 1b is formed to have a shape like two channels combined with each other to open forward and rearward; it comprises, as shown in FIG. 5, an upper portion 10, a lower portion 11 in parallel to the upper portion 10, and a vertical intermediate wall portion 12 connecting intermediate portions of the upper and lower portions with each other at its portion taken along line S5—S5 in FIG. 3.

Figure 5:
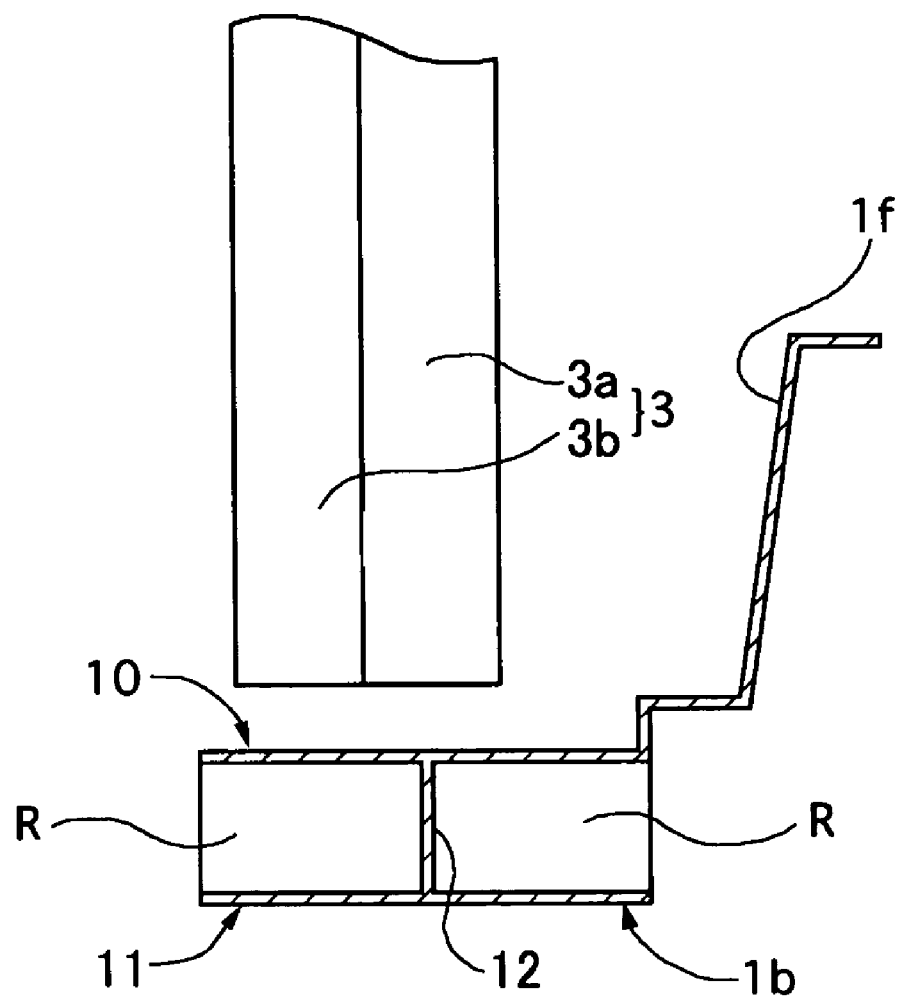
FIG. 5 is an enlarged cross-sectional view showing a lower heat exchanger support member taken along line S5—S5 in FIG. 3 and located under a heat exchanger.

As seen in FIGS. 1, 3, and 5, in each channel of the upper and lower support members 1a and 1b, there are provided a plurality of alternately slanted ribs R which are arranged to run in a zigzag line to reinforce mechanical strength of the upper and lower support members 1a and 1b. Each rib R is formed to extend in a depth direction of the upper and lower support members 1a and 1b.

The upper and lower heat exchanger support members 1a and 1b, the hood lock stay 1c, the right and left side support members 1d, the right and left side attachment portions 1e and 1e, and the fan shrouds 1f of the heat exchanger support 1 are integrally formed of glass-fiber reinforced resin by injection molding.

The heat exchanger support 1 has right and left extending parts 1g made of steel attached at top side portions thereof, a finisher cover 5 on the top surface of the upper support member 1a, right and left air guides 23 attached to the right and left side support members 1d, and right and left bumper stays 6, on which a bumper armature 4 is bolted, attached to the right and left side support members 1d. On the finisher cover 5 are fixed a reservoir tank 20 and a washer tank 22. The finish cover 5 can be easily bolted on the top surface of the upper support member 1a and functions a part of the upper support member 1a for easily installing the heat exchanger 3 in the heat exchanger support 1.

The above assembly of the heat exchanger 3 and the heat exchanger support 1 is conveyed as a front end module to a vehicle body assembly firm for being mounted to a vehicle body.

The heat exchanger 3 is supported by the heat exchanger support 1 as follows: The heat exchanger 3 is provided with upper supported portions composed of upper pins P1 separated laterally from each other and projecting from the top portions of the upper support member 1a, and lower supported portions composed of lower pins P2 to be separated laterally from each other and projecting from the bottom portions of the lower support member 1b.

Figure 4:
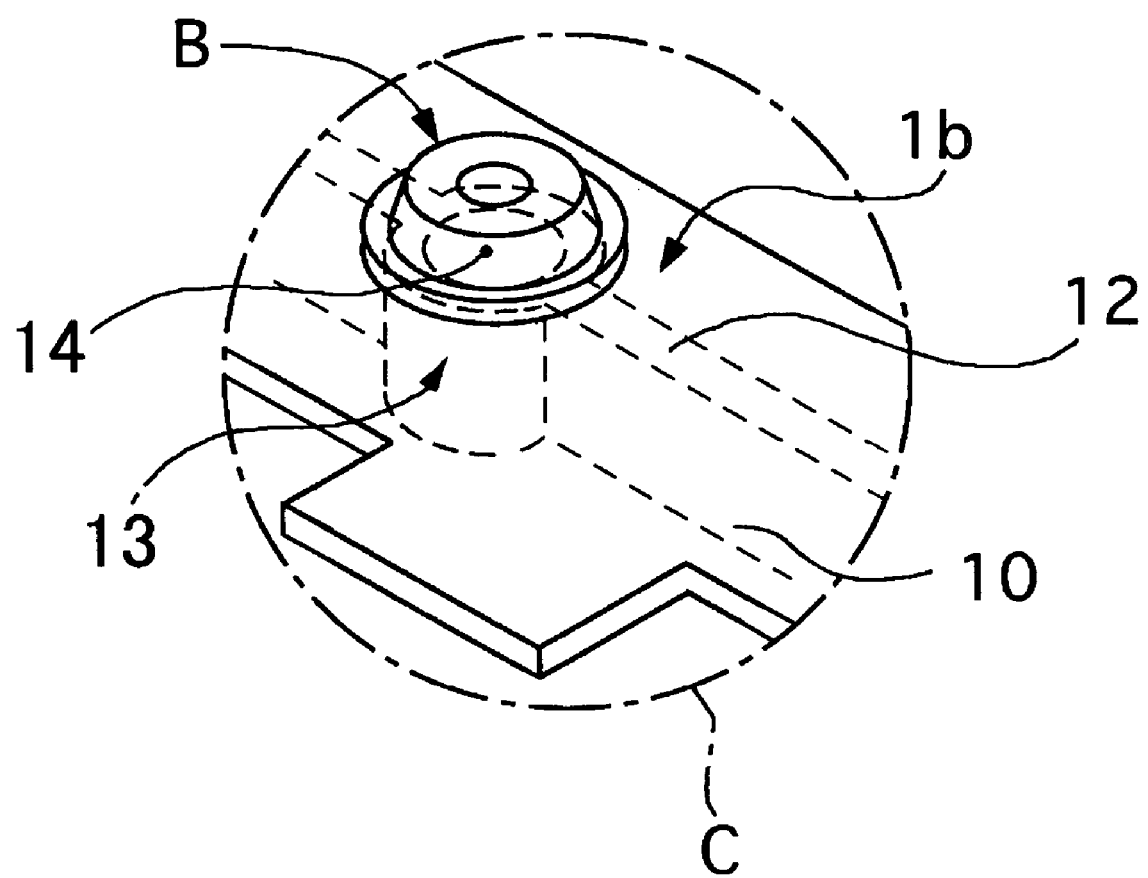
FIG. 4 is an enlarged fragmentary perspective view showing a lower supporting portion, which is formed on a lower heat exchanger support member of the heat exchanger support, indicated in a circle C of FIG. 3.
Figure 6:
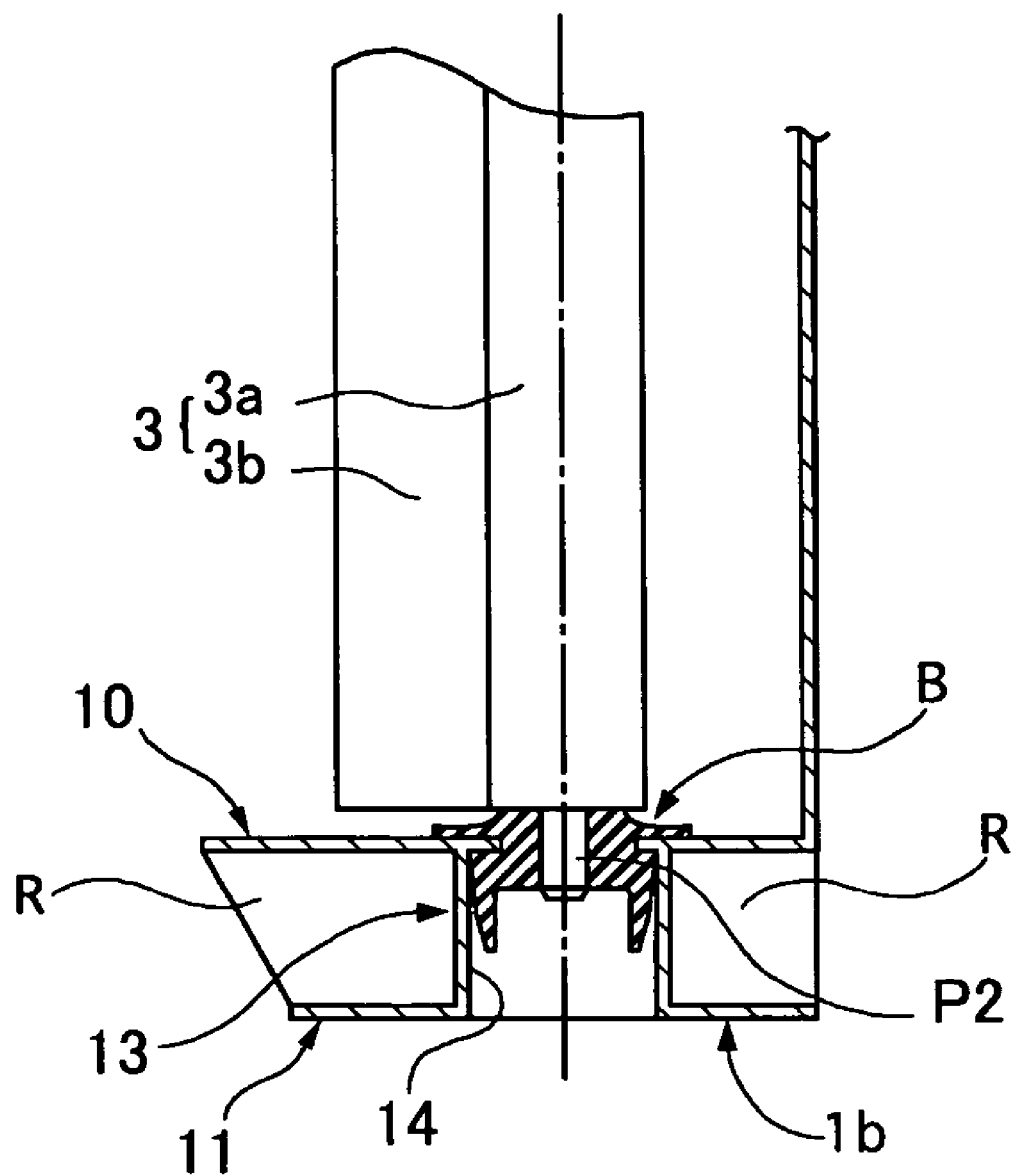
FIG. 6 is an enlarged sectional view showing a lower heat exchanger support member with the lower supporting portion, taken along line S6—S6 in FIG. 3, to resiliently support the heat exchanger.

The finisher cover 5 is formed with two upper supporting portions comprising holes separated laterally from each other to receive the upper pins P1 of the heat exchanger 3 with a rubber member, not shown, disposed therebetween as shown in FIG. 1. The lower support member 1b is formed with two lower supporting portions 13 composed of cylinders having a hole 14 to receive the lower pin P2 and a rubber member B as shown in FIGS. 4 and 6. The cylinders, as the lower supporting portions 13, are connected with the wall portion 12.

Each lower pin P2 of the heat exchanger 3 is inserted into the hole 14 of the lower supporting portion 13 of the lower heat exchanger support member 1b with the rubber member B disposed between the lower pin P2 and the cylinder so that the heat exchanger 3 is resiliently supported on the lower heat exchanger support member 1b.

The cylinder of the lower heat exchanger support member 1b forms and functions as the vertical wall portion. The rubber member B is formed to have a first cylindrical portion larger than the hole 14 in diameter and a second cylindrical portion integrally connected with the first cylindrical portion and being inserted into the hole 14 of the cylinder. The rubber members B are designed to function as a dynamic damper to reduce vibration of the heat exchanger 3.

The lower heat exchanger support member 1b made of resin can reduce its weight, and its H shaped structure causes the lower supporting portion 13 to have sufficient rigidity against shearing forces for a long time. Moreover, resilient supporting of the heat exchanger 3 can reduce external forces transmitting to the heat exchanger and accuracy of position relationships between the lower pins P2 and the holes 14 of the cylinders. Using the lower pin and the cylinder makes their assembly easy and brings about reliable support.

Figure 7:
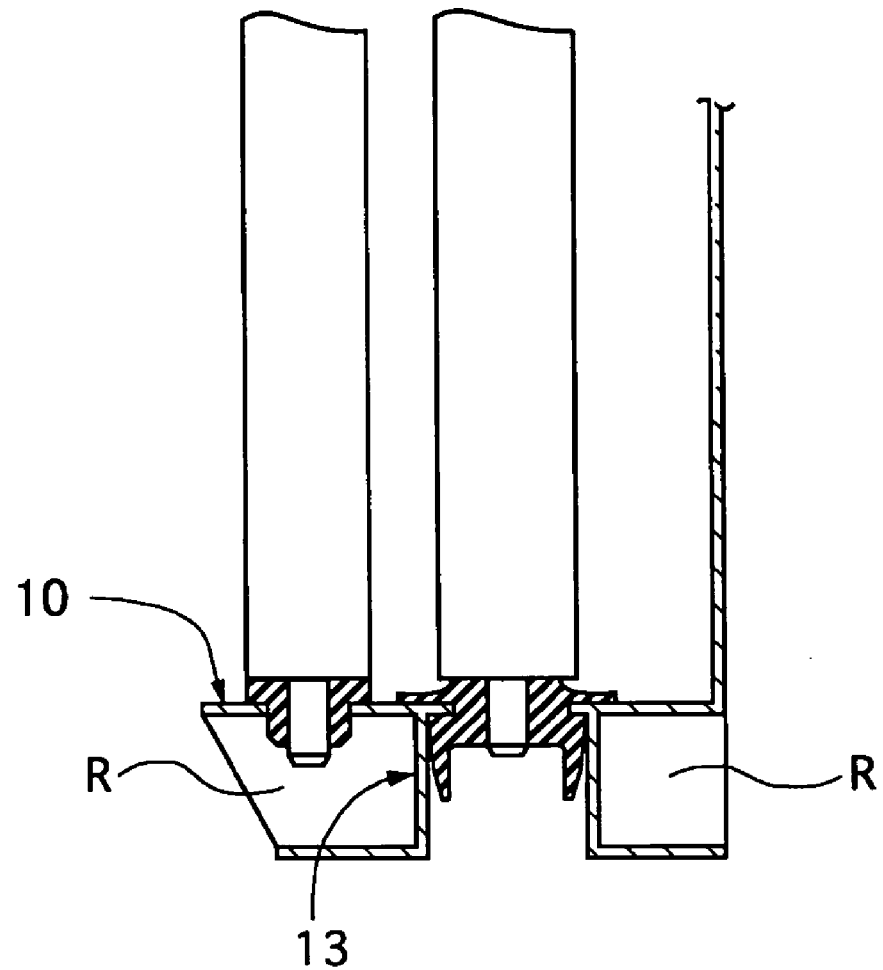
FIG. 7 is an enlarged sectional view showing another lower heat exchanger support member with supporting portion, different from the support portion of the lower heat exchanger support member shown in FIG. 6, to resiliently support a radiator and a condenser independently, of a second preferred embodiment of the heat exchanger support structure according to the present invention.

Referring to FIG. 7 of the drawings, there is shown a heat exchanger support structure of a second preferred embodiment according to the present invention. In this embodiment, a heat exchanger is composed of a radiator 3a and a condenser 3b separated from each other. The radiator 3a and the condenser 3b respectively have upper pins, not shown, and lower pins. The pin of the condenser 3b is inserted into a hole of a cylinder as a lower supporting portion 13 of the lower heat support member 1b with a first rubber member disposed between them, and the pin of the radiator 3a is inserted into a hole formed on an upper portion 10 with a second rubber member disposed between them. This support structure can obtain the advantages similar to the first embodiment. In this second embodiment, the positions of the radiator 3a and the condenser 3b can be changed for each other.

The entire contents of Japanese Patent Application No. (Tokugan) 2003-275626 filed Jul. 17, 2003 is incorporated herein by reference.

Although the invention has been described above with reference to the embodiment of the invention, the invention is not limited to such embodiment as described above. Various modifications and variations of such embodiment may be carried out by those skilled in the art, in light of the above description.

For example, the heat exchanger support structure can be mounted not only to the front end portion of a vehicle body but to another portion of the vehicle body, such as the rear portion or intermediate portion.

The heat exchanger and the heat exchanger support can be installed along a lateral direction of a motor vehicle or a longitudinal direction.

What is claimed is:

1. A heat exchanger support structure of a motor vehicle, comprising:
    a heat exchanger provided with upper and lower supported portions at respective top and bottom portions thereof, said lower supported portion of said heat exchanger having a lower pin projecting from said bottom portion thereof;
    an upper heat exchanger support member that extends in a lateral direction and supports said upper supported portion of said heat exchanger;
    a lower heat exchanger support member that extends in the lateral direction and is located parallel to and vertically apart from said upper heat exchanger support member, said lower heat exchanger support member having a lower supporting portion to support said lower supported portion of said heat exchanger;
    a right side support member connecting right side portions of said upper and lower heat exchanger support members with each other; and
    a left side support member spaced laterally apart from said right side support member and connecting left side portions of said upper and lower heat exchanger support members with each other;
    wherein said lower heat exchanger support member is made of resin and formed in a capital H shape as seen on a cross section taken along a depth direction thereof, including an upper portion, a lower portion separated vertically from said upper portion and a vertical wall portion connecting intermediate portions of said upper and lower portions, said lower supporting portion of said lower heat exchanger support member comprising a cylinder connected with said vertical wall portion and formed with a hole to receive said lower pin.

2. The heat exchanger support structure of claim 1, wherein said lower pin of said heat exchanger is inserted into said hole of said lower supporting portion of said lower heat exchanger support member and a rubber member is disposed between said lower pin and said cylinder so that said heat exchanger is resiliently supported on said lower heat exchanger support member.

3. The heat exchanger support structure of claim 2, wherein said rubber member is designed to function as a dynamic damper by using the mass of said heat exchanger to reduce vibration of said heat exchanger.

4. The heat exchanger support structure of claim 2, wherein said rubber member comprises a first cylindrical portion larger than said hole in diameter and a second cylindrical portion that is integrally connected with said first cylindrical portion and inserted into said hole of said cylinder.

5. The heat exchanger support structure of claim 1, wherein said lower heat exchanger support member has a plurality of ribs connecting said upper and lower portions with each other on both sides of said vertical wall portion.

6. The heat exchanger support structure of claim 5, wherein said ribs are slanted with respect to said upper and lower portions so as to run in a zigzag line.

7. The heat exchanger support structure of claim 1, wherein said heat exchanger comprises a radiator and a condenser which are combined with each other.

8. The heat exchanger support structure of claim 1, wherein said heat exchanger comprises a radiator with first upper and lower supported portions and a condenser with second upper and lower supported portions, said upper heat exchanger support member having upper supporting portions to respectively support said first and second upper supported portions of said radiator and said condenser, and said lower heat exchanger support member having lower supporting portions to respectively support said first and second lower supported portions of said radiator and said condenser.

9. The heat exchanger support structure of claim 8, wherein said first and second lower supported portions of said radiator and said condenser comprise lower pins and said lower supporting portions are formed with holes to receive said pins.

10. The heat exchange support structure of claim 9, wherein said lower pins of said radiator and said condenser are inserted into said holes of said lower supporting portions of said lower heat exchanger support member and cylindrical rubber members are disposed in said holes to receive said lower pins so that said radiator and said condenser are resiliently supported on said lower heat exchanger support member.

11. The heat exchange support structure of claim 10, wherein said rubber members are designed to function as dynamic dampers by using the mass of said heat exchanger to reduce vibration of said heat exchanger.

12. The heat exchanger support structure of claim 9, wherein said lower supporting portions are arranged along a depth direction of said lower heat exchanger support member, one of said lower supporting portions comprising a cylinder formed with a hole to receive one of said lower pins.

13. The heat exchanger support structure of claim 1, wherein said upper and lower heat exchanger support members and said right and left side support members are made of resin and integrally formed.

14. The heat exchanger support structure of claim 1, wherein said upper heat exchanger support member comprises a detachable finisher cover having an upper supporting portion to support said upper supported portion of said heat exchanger.

15. A heat exchanger support structure of a motor vehicle comprising:

a heat exchanger respectively provided with upper and lower supported portions at respective top and bottom portions thereof, said lower supported portion of said heat exchanger having a lower pin projecting from said bottom portion thereof;

an upper heat exchanger support member that extends in a lateral direction and supports said upper supported portion of said heat exchanger;

a lower heat exchanger support member that extends in the lateral direction and is located parallel to and vertically apart from said upper heat exchanger support member, said lower heat exchanger support member having a lower supporting portion to support said lower supported portion of said heat exchanger;

a right side support member connecting right side portions of said upper and lower heat exchanger support members with each other; and a left side support member spaced laterally apart from said right side support member and connecting left side portions of said upper and lower heat exchanger support members with each other;

wherein said lower heat exchanger support member includes an upper portion, a lower portion separated vertically from said upper portion and a vertical wall portion connecting intermediate portions of said upper and lower portions, said lower supporting portion of said lower heat exchanger support member comprising a cylinder, said cylinder being formed with a hole to receive said lower pin, and wherein said cylinder is integral with and positioned along said vertical wall portion.

* * * * *